United States Patent [19]

Ager

[11] Patent Number: 4,466,192

[45] Date of Patent: Aug. 21, 1984

[54] METHOD OF ENHANCING THE PRODUCTION OF TYPESET RUNAROUNDS

[75] Inventor: Verkuilen B. Ager, Rochester, N.Y.

[73] Assignee: Itek Corporation, Lexington, Mass.

[21] Appl. No.: 477,543

[22] Filed: Mar. 21, 1983

[51] Int. Cl.[3] ................................................ G01B 5/26

[52] U.S. Cl. .................................... 33/1 B; 33/184.5; 354/5

[58] Field of Search .................. 354/5, 8, 13; 33/1 B, 33/1 C, 1 G, 1 K, 1 BB, 184.5

[56] References Cited

U.S. PATENT DOCUMENTS

| | | | |
|---|---|---|---|
| 1,185,995 | 6/1916 | Gibson et al. | 33/184.5 X |
| 2,307,358 | 1/1943 | Cloud | 33/1 K |
| 2,375,427 | 5/1945 | Mannino | 33/1 B |
| 3,890,715 | 6/1975 | Kaplan | 33/1 B |

*Primary Examiner*—Harry N. Haroian
*Attorney, Agent, or Firm*—Homer O. Blair; Robert L. Nathans; Gerald H. Glanzman

[57] ABSTRACT

A method of enhancing the production of typeset runarounds involves providing a set of light transmissive overlays having straight line rectangular grid configurations to the operator of the phototypesetter, together with a worksheet for recording line indentation data; selecting one overlay having horizontal grid line spacing corresponding to spacings between the lines of the text to be typeset, superimposing the selected overlay so that the edges thereof are aligned with the extremities of the text, recording indentation information which is readily made apparent by virtue of the overlay placement, and thereafter employing the recorded indentation data during the phototypesetter process.

4 Claims, 4 Drawing Figures

WORKSHEET

Job *ItEK RunaRound (right)*

Line Length *20 picas* Line Space *12 point*

| Line | Indent Left | Indent Right |
|---|---|---|
| 1. | *0* | *0* |
| 2. | | *0* |
| 3. | | *0* |
| 4. | | *10* |
| 5. | | *10* |
| 6. | | *10* |
| 7. | | *10* |
| 8. | | *10* |
| 9. | | *10* |
| 10. | | *10* |
| 11. | | *10* |
| 12. | | *10* |
| 13. | | *0* |
| 14. | | *0* |
| 15. | | *0* |
| 16. | | |

METHOD OF ENHANCING THE PRODUCTION OF TYPESET RUNAROUNDS

BACKGROUND OF THE INVENTION

The present invention relates to the field of phototypesetting.

In certain situations, it is desirable to typeset lines of characters in a manner to produce a void of particular size and configuration within the text (e.g., a rectangle), such void being employed to accommodate graphic indicia therein such as a diagram or other figure. In order to facilitate the production of such a void during the typesetting process, it is desirable to facilitate the necessary indentation of selected lines of text during the typesetting of the text. It is also desirable to facilitate the typesetting of bodies of text having desired shapes, in contrast to a void.

Accordingly, it is a principal object of the present invention to provide a kit and method of using the kit, which is employed by the operator of a phototypesetter to facilitate the production of the above-mentioned void or shaped body of text.

SUMMARY OF THE INVENTION

In accordance with a preferred method of the present invention, a kit is provided for use by the operator of a phototypesetter to facilitate typesetting text in a manner to accomplish the above-mentioned objects, such kit comprising a set of transparent overlays, each having rectangular grid configurations wherein the spacing between the horizontal lines of each overlay differs from the spacing between the horizontal lines of the other overlays. A particular overlay is selected depending upon the line spacing of the text, and is superimposed over the text to, in turn, enable the operator to record indentation data on a worksheet which facilitates the production of selected configurations of bodies of text and voids during phototypesetting.

Other objects, features and advantages of the invention will become apparent upon the reading of the following description, taken in conjunction with the drawings in which.

DETAILED DESCRIPTION

Figure 1:
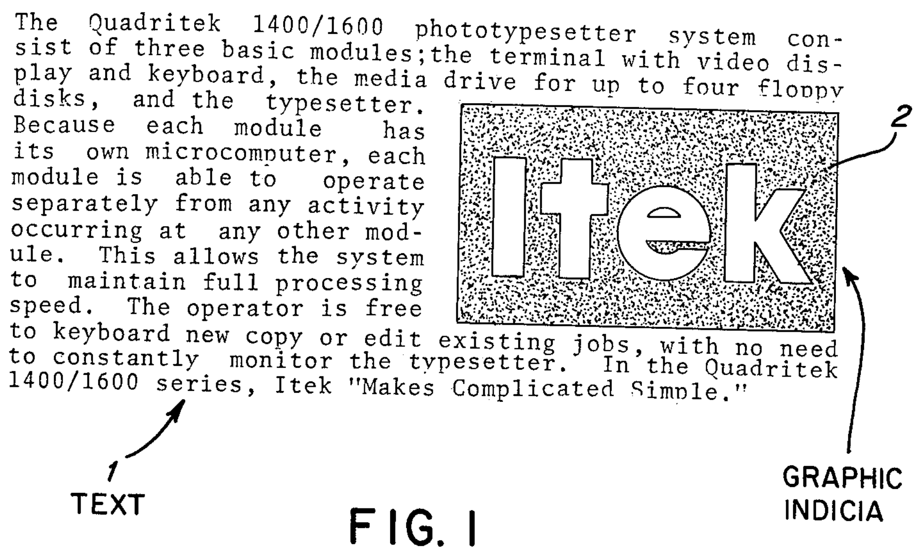
FIG. 1 illustrates the above-mentioned void in the text.

In FIG. 1, justified text 1 is schematically illustrated, having a rectangular void 2 therein which is employed to accommodate any form of graphic indicia. The void is produced by having the operator cause the text on the fourth through the twelfth lines to be indented, with respect to the right-hand margin of the text. This process is facilitated by supplying the operator with a set of transparent overlays, a portion of one overlay being illustrated in FIG. 2, such overlays having vertical and horizontal lines recorded in a rectangular grid configuration and consecutively numbered, as illustrated. Another transparent overlay, such as partially illustrated in FIG. 3, has horizontal lines separated by a different distance relative to the overlay of FIG. 2. In the commercial embodiment of the kit employed in the present invention, seventeen overlays are provided to accommodate seventeen different line spacings between text to be phototypeset. Each overlay has thirty-nine columns, and a number of rows (e.g., seventy-nine) which vary as a function of line spacing.

Figure 2:
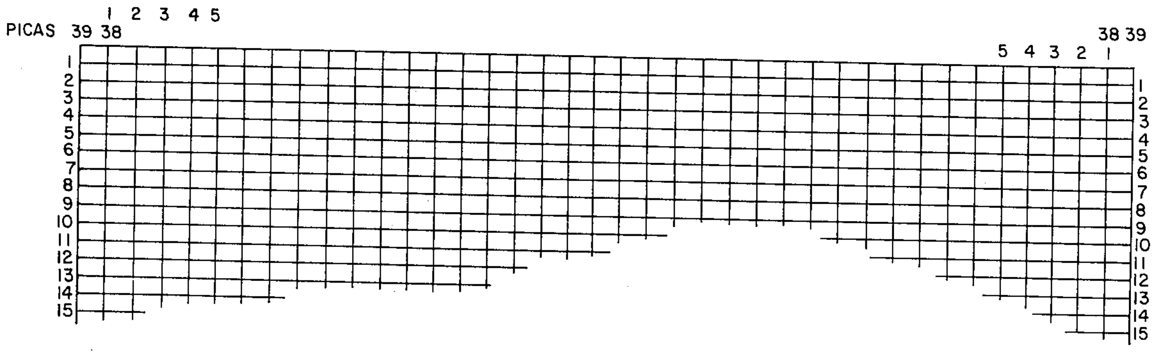
FIG. 2 illustrates a portion of one transparent overlay utilized in the method of the present invention.
Figures 3, 4:
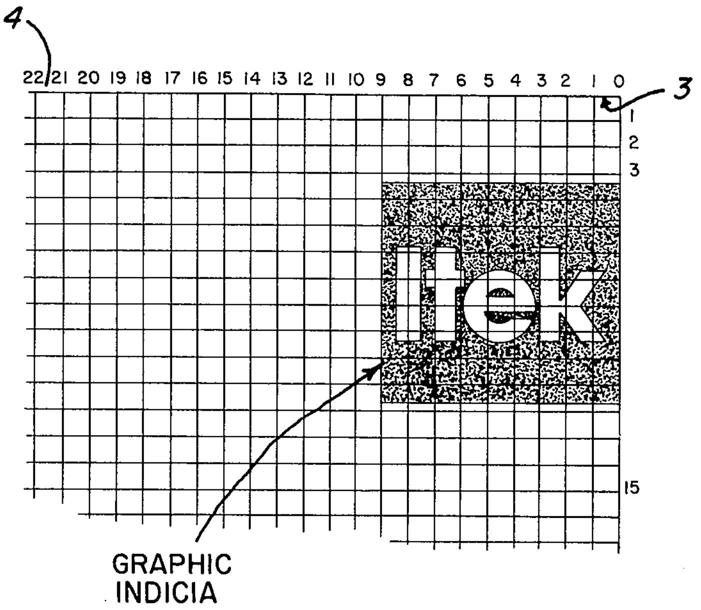
FIG. 3 illustrates a portion of another transparent overlay positioned over the text.
FIG. 4 illustrates a worksheet employed in the method of the present invention.

Now, let it be assumed that it is desirable for the operator to typeset the text 1 of FIG. 1, having the indentation as indicated to produce rectangular void 2 for accommodating graphic indicia to be placed therein after phototypesetting. Transparent overlay 3 is positioned over the text of FIG. 1 at a position wherein the extreme edges of the rectangular grid of the selected overlay are aligned or at least approximately aligned with the extremities of the text, and the horizontal lines of the overlay are parallel to the lines of text, all as illustrated in FIG. 3. A worksheet shown in FIG. 4 is utilized by the operator to assist in creating the void. The operator observes that lines four through twelve should be indented by an estimated ten columns or units to define the left-hand boundary of the rectangular void within the text and records this data, as illustrated in FIG. 4. The worksheet is thereafter employed to assist the operator during phototypesetting. The particular line number being typed is displayed on the screen of the phototypesetter, together with the particular column in which each letter is being set, the columns being numbered as indicated at the top of FIGS. 2 and 3. By merely glancing at the worksheet, the operator typesets the first three lines without indentation, as indicated by the zeros. The worksheet now tells her that lines 4–12 should be indented by 10 units, so that during the typesetting of lines 4–10, she watches for the production of the number 10 in the "column-being-typed" portion of the screen, and she thereafter proceeds to the next line, and so on, to generate the appropriate indentation to create the desired void. When she observes on the screen of the phototypesetter that line 13 is being typeset, the previously recorded data (zero) on the worksheet tells her to proceed to the end of the line in the normal manner.

Accordingly, the present invention facilitates the indentation of text to accommodate graphic indicia. While the above example is relatively simple, other voids may have complex shapes to accommodate graphic indicia having complex configurations. For example, the right hand portion of the text may be skewed at an angle so that the "indent right" worksheet column could read, for example, 0, 0, 1, 2, 3, 4, 5, etc. Other voids placed totally within a body of surrounding text would additionally include fixed or variable "indent left" data. Another complex example could involve a body of text (rather than a void) shaped to represent an outline of the head of Lincoln and the Gettysburg address could be typeset within the shaped boundary defined by the left and right indents.

The above description of the invention is merely exemplary and the scope of the invention is to be measured by the terms of the following claims and reasonable equivalents thereof.

I claim:

1. A method of facilitating, by means of a typesetter, the formatting of typeset text derived from text to be typeset having a given line spacing and having a runaround therein comprising the steps of:

a. providing a set of light-transmissive overlays having vertical and horizontal straight lines recorded thereon in rectangular grid configurations, each overlay having spacings between said horizontal lines which differ with respect to the spacings between said horizontal lines of the other overlays;

b. selecting an overlay from said set having spacings between the horizontal lines thereof corresponding to said given line spacing of said text to be typeset;

c. superimposing the selected overlay over said text to be typeset at a position wherein the extreme edges of said rectangular grid of said selected overlay are approximately aligned with the extremities of said text to be typeset, and said horizontal lines are parallel to said lines of text;

d. recording the desired indent relative to an edge of said rectangular grid for each line of text; and e. employing said recorded indents for each line of text during the operation of said phototypesetter to produce said runaround within said typeset text.

2. The method as set forth in claim 1 wherein said lines of said grid configurations are consecutively numbered.

3. A method of facilitating, by means of a typesetter, the formatting of typeset text, derived from text to be typeset having a given line spacing and having a runaround therein comprising the steps of:

a. providing a kit comprising a set of light-transmissive overlays having vertical and horizontal straight lines recorded thereon in rectangular grid configurations, each overlay having spacings between said horizontal lines which differ with respect to the spacings between said horizontal lines of the other overlays, together with a worksheet for recording indentation data correlated with lines of type to be set by said phototypesetter;

b. selecting an overlay from said set having spacings between the horizontal lines thereof corresponding to said given line spacing of said text to be typeset;

c. superimposing the selected overlay over said text to be typeset at a position wherein the extreme edges of said rectangular grid of said selected overlay are approximately aligned with the extremities of said text, and said horizontal lines are parallel to said lines of text;

d. recording the desired indent relative to an edge of said rectangular grid for each line of text to be typeset upon said worksheet; and e. employing said recorded indents for each line of text during the operation of said phototypesetter to produce said runaround within said typeset text.

4. The method as set forth in claim 3 wherein said lines of said grid configurations are consecutively numbered.

* * * * *